United States Patent [19]

Besik

[11] Patent Number: 4,952,283

[45] Date of Patent: Aug. 28, 1990

[54] APPARATUS FOR VENTILATION, RECOVERY OF HEAT, DEHUMIDIFICATION AND COOLING OF AIR

[76] Inventor: Ferdinand K. Besik, 2562 Oshkin Ct., Mississauga, Ontario, Canada, L5N 3Z3

[21] Appl. No.: 152,808

[22] Filed: Feb. 5, 1988

[51] Int. Cl.$^5$ .................... F28D 17/02; F25B 17/08
[52] U.S. Cl. ............................ 165/4; 165/7; 165/54; 165/97; 62/271
[58] Field of Search ............ 165/7, 4, 54, 97; 62/271

[56] References Cited

U.S. PATENT DOCUMENTS

| | | | |
|---|---|---|---|
| 1,994,515 | 3/1935 | Hausen et al. | 62/271 |
| 2,026,936 | 1/1936 | Downs | 62/271 |
| 2,272,108 | 2/1942 | Bradley | 165/4 |
| 2,735,278 | 2/1956 | Rice | 165/4 |
| 3,812,903 | 5/1974 | Thomason | 165/48.2 |
| 3,880,224 | 4/1975 | Weil | 165/7 |
| 4,219,341 | 8/1980 | Hussmann | 62/271 |

FOREIGN PATENT DOCUMENTS 3613942 10/1987 Fed. Rep. of Germany .......... 165/4
88329 6/1958 Netherlands .......... 62/271

Primary Examiner—Albert W. Davis, Jr.

[57] ABSTRACT

An apparatus for ventilation, recovery of heat, dehumidification and cooling of air or industrial gases for use in industrial processes and in air conditioning of residential, commercial and industrial building comprises a highly effective valveless periodic flow type dehumidifier-heat exchanger in which a countercurrent flow of two gaseous streams through a stationary matrix of a desiccant and a solid heat exchanging material is achieved by an air fan controlled by a variable timer controller. The stationary matrix may include a single bed or two beds of solid materials with distinguished mositure and heat sorption properties, a heater and a wet filter to provide simultaneously an effective transfer of heat and moisture, removal of particulates and adiabatic cooling of the two gaseous streams.

The released sorption heat is temporarily stored within the matrix material and then used in reactivation of the desiccant. If required, the additional heat may be conveniently provided by a fossil fuel, electric, solar or waste heat energy sources. Small amount of power is used in operation of the air fan that may also provide ventilation of the air conditioning building.

24 Claims, 3 Drawing Sheets

APPARATUS FOR VENTILATION, RECOVERY OF HEAT, DEHUMIDIFICATION AND COOLING OF AIR

FIELD OF INVENTION

The present invention relates to an apparatus for ventilation, recovery of heat, dehumidification and cooling of air or industrial gases for use in industrial processes and in air conditioning of residential, commercial and industrial buildings.

BACKGROUND TO THE INVENTION

The objective of gas to gas heat and moisture transfer devices is to transfer heat from a hot gas stream to a cold gas stream and or to transfer moisture from a moist gas stream to a relatively dry gas stream to reduce the consumption of energy in an industrial process or in heating and air conditioning of a building. In practice the moisture is so frequently water and the gas so frequently air that this combination will provide the basis for the description of this invention. It is important to emphasize, however, that the equipment, techniques, and relationships are equally applicable to other systems as well.

There are three general groups of applications where air to air heat and moisture transfer devices are being used, including:

process-to-process applications, where heat and moisture is transferred from a hot and or moist waste gas stream into incoming cool or dry process gas stream, process-to-comfort applications, where heat is transferred from a hot waste gas stream into an air stream used to heat or cool a building, and in comfort-to-comfort applications, where heat and moisture is transferred between the exhaust air and the supply air streams, with the enthalpy of the supply air being lowered during summer and raised during the winter.

Devices capable of transferring of only the sensible heat are known as the sensible heat exchangers, those capable of transferring heat and moisture as total energy exchangers and or as adsorption or absorption dehumidifiers.

The two types total energy exchangers and or dehumidifiers capable of transferring heat and moisture between two air streams are the rotary wheel types and the valved types exchangers. Both types have the capability and are also used as only the sensible heat exchangers.

In both moisture as well as heat is transferred between the two air streams by first absorbing heat and or moisture from the first hot and or moist air stream into a porous matrix of a suitable solid material during the first, i.e. sorption period, and then by releasing the heat and or moisture from the matrix into the second a relatively cool and or dry air stream during the second, i.e. desorption period. The two sorption-desorption periods represent the operating cycle of the two types matrix based heat and moisture transfer devices.

In the rotary types, the rotation of the matrix provides the flow of the solid phase from the hot and or moist side to the cool and or dry side air streams in a regular periodic manner, with the matrix being alternately saturated with moisture and then dried, and or heated and then cooled, with the moisture and or heat being transferred indirectly from the moist and or hot air stream to the relatively dry and or cool air stream.

In the valved types, using one or more identical matrices, each matrix is functioning alternately as either the moist and or hot flow or a dry and or cold flow matrix, with the two air streams being regularly switched between the two matrices by means of a periodic switching of quick operating valves.

The heat and mass transfer theory which applies equally to both types has been described elsewhere (W.M. Kays, A. L. London, "Compact heat exchangers", McGraw Hill Book Co., sec.ed.,1964; W. H. McAddams, "Heat Transmission", 3rd ed., McGraw Hill Book Co., 1954; P. C. Wancat, "Large-scale Adsorption and Chromatography", CRC Press Inc., 1986).

The major advantages of the periodic flow type heat and moisture exchangers compared with the direct type heat exchangers are:

capability to function as sensible heat transfer devices, moisture transfer devices, and total energy transfer devices, a much more compact heat and or moisture transfer surface can be used, the heat and moisture transfer surface in general is substantially less expensive, the periodic flow reversals eliminate permanent flow stagnation regions negatively affecting performance and effectiveness, due to flow reversals the heat and or moisture transfer surfaces tend to be self cleaning, the relatively simple modulation of the operating cycle time permits inexpensive modulation of the performance and effectiveness.

A recognized disadvantage of the matrix based devices is some mixing of the two air streams due to carry over and leakage.

Since the two air streams are usually at different pressures, and since perfect sealing of large rotary surfaces is difficult if not impossible, the leakage of the rotary types is practically unavoidable. With the valved types the leakage can be eliminated.

The carry over for both types depends on the operating cycle time and on the void of the matrix, and for both types can be reduced or eliminated by purging of the matrix for the rotary types, or by discarding the contaminated portion of the clean air stream for the valved types.

A disadvantage of the rotary types is a relatively expensive matrix, housing, seals and drives, and a disadvantage of the valved types is the relatively expensive valving, piping or ducting associated with considerable flow resistances affecting consumption of electric power in used air movers.

Consequently, the objective of the present invention is to provide an improved periodic flow type heat exchanger-dehumidifier with reduced mixing of the two air streams, with reduced flow resistances, with easy modulation of the performance and effectiveness and with reduced capital and operating costs for use in the various proces-to-process, process-to-comfort, and comfort-to-comfort gas to gas heat and or moisture transfer applications.

BRIEF DESCRIPTION OF THE INVENTION

The present invention relates to a compact dehumidifier-heat exchanger intended for use in process-to-process, process-to-comfort, and comfort-to-comfort moisture and or heat transfer applications.

According to described embodiments the apparatus of the present invention is a valveless periodic flow type dehumidifier-heat exchanger in which the periodic countercurrent flow of the two air streams through the matrix is achieved by a reversing air fan. The operating cycle of the apparatus comprises a sorption period followed by a desorption period with the duration time of the two operating periods being controlled and maintained by a variable timer.

Depending on application, the matrix may include adsorbents and or granular solids of heat absorbing materials, or porous solids impregnated with suitable absorbents in a single porous bed or in separated parallel beds of distinguished heat and moisture sorption properties. To enhance the transfer of moisture between the two air streams the matrix may also include a heater and a wet filter.

Using a relatively large frontal area of the matrix the flow resistances are minimized, and with simple matrix container, inexpensive matrix and a low pressure air fan the capital and operating costs of the apparatus are reduced while the effectiveness of the apparatus is improved.

DETAIL DESCRIPTION OF EMBODYMENTS

Figure 1:
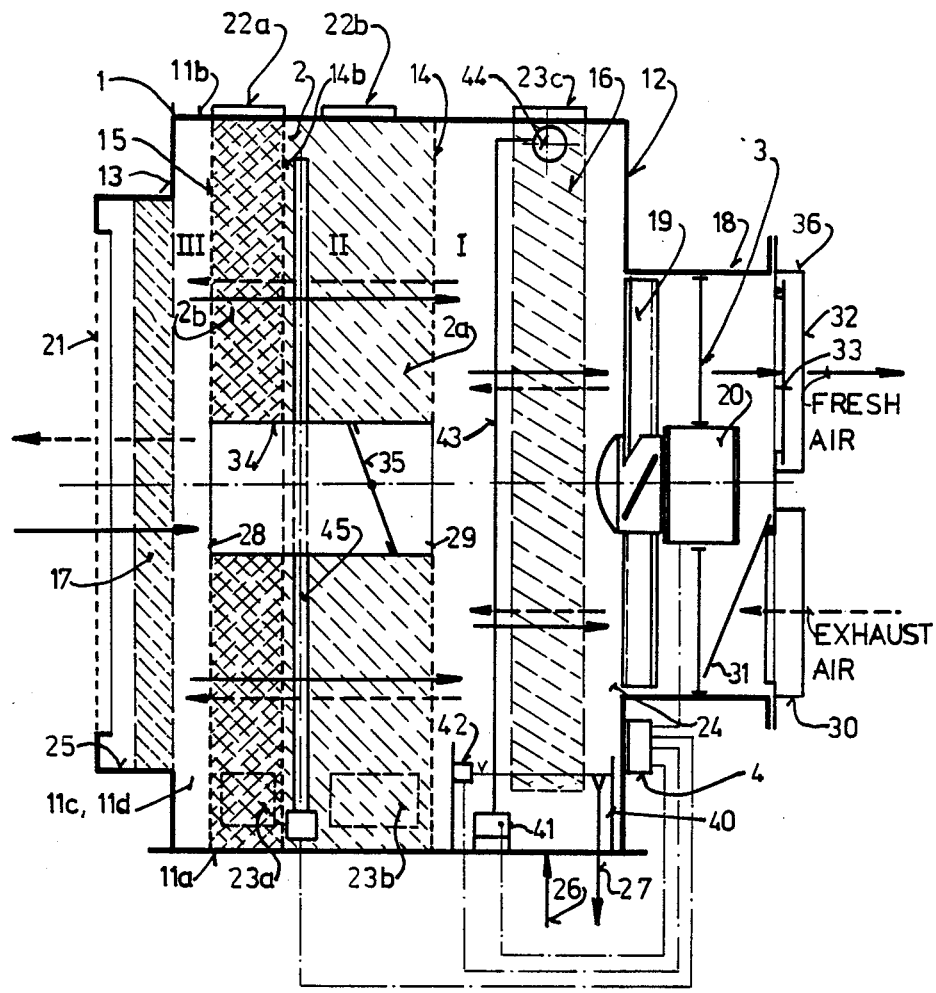
FIG. 1 is a schematic of one preferred embodyment of the apparatus of the present invention intended for use in ventilation, heat recovery, dehumidification and cooling of air.

Referring to drawings, FIG. 1 shows one preferred embodyment of the apparatus of the present invention intended for use in air conditioning of industrial, commercial and residential buildings, houses and mobile homes.

Since the design and operating principles of periodic flow type heat and moisture transfer devices are described in detail in the listed references, the following description of the invention is limited to basic features of the invented apparatus.

As schematicaly indicated in FIG. 1 the apparatus comprises a matrix container 1, a stationary matrix 2, an air fan 3, and a variable timer controller 4.

The matrix container 1 is generally rectangular with four side walls 11a–11d, a front wall 12 and a rear wall 13. The front wall 12 has an opening 24 for intake of the exhaust air and discharge of the fresh air, and the rear wal has an opening 25 for discharge of the exhaust air and intake of the outdoor fresh air.

Within the matrix container 1 there are two screens 14, 15 secured to side walls 11a–11d separating the container 1 into three consecutive chambers, with the first chamber I defined by screen 14, front wall 12 and four side walls 11a–11d, the second chamber II defined by the two screens 14, 15 and the four side walls 11a–11d, and the third chamber III by screen 15, rear wall 13 and the four side walls 11a–11d.

The first chamber I includes a wet filter 16 and extends into the air fan housing 18, the third chamber III includes a dry filter 17 and a bird screen 21, and the second chamber II includes the matrix 2. The first and the third chambers are in communication with each other via a bypass duct 34 and openings 28, 29 with damper 35 controlling the flow of the air through the bypass duct 34. Ducting 36 with gravity back draft dampers 31, 33 attached to the housing 18 is provided for intake of the exhaust air from duct 30 and discharge of the fresh air into duct 32.

The matrix 2 may include a single bed of solids, or it may include two parallel beds of solids 2a, 2b, and a heater 45. Depending on application, the single bed may include heat absorbing solids such as ceramic or brick pieces, stone gravel or pebbles, fired pellets of minerals or conventional ceramic, metal or plastic packings of different shapes, corrugated metal or wire mesh, or it may include a mixture of heat absorbing solids and adsorbents, or granular solids impregnated with suitable absorbents.

The two beds of solids 2a, 2b shown in FIG. 1 are conveniently separated by screen 14b secured to side walls 11a–11d. The two bed matrix is known to be more effective in dehumidification and cooling of air (Besik, F. U.S. Pat. No. 4,711,097), however, it requires additional heat which is conveniently supplied by the heater 45 installed in bed 2a close to screen 14b.

Thus for instance, with bed 2a containing heat absorbing solids and with bed 2b a suitable absorbent, moisture will be transferred from the incoming fresh outdoor air into the exhaust air, with the heater heating the exhaust air during the desorption period.

The air filter 16 is a conventional wet filter-humidifier and is conveniently located between the screen 14 and the air fan housing 18. The wet filter 16 includes a water pump 41, a water container 40, water level controller 42, water line 43, water distribution channel 44, make up water line 26 and a water sink 27. The wet filter 16 provides wet cleaning and adiabatic cooling of the two air streams. The flanged openings 22a, 22b, 23a, 23b are provided for replacement of the solids from the porous beds 2a, 2b, and the opening 23c for the removal of the wet filter media 16.

The preferred particle size of the solids is in the range from $\frac{1}{8}''$ to $\frac{3}{4}''$, and the preferred overall pressure drop across the matrix container 1 including the matrix 2 and filters 16, 17 for the required flow of the two air streams is in the range from 0.2" WC ot 1.0" WC.

The heater 45 may be a conventional built in electric heater, or it may be a conventional tubular heat exchanger with a hot fluid flowing through it, with the hot fluid being either a liquid or gas, with the heater preferrably operating periodically and at the end of the desorption period.

The air fan 3 includes a housing 18 attached to the front wall 12 of the container 1, an axial type propeller 19, and a reversible electric motor 20 secured to housing 18. When the air fan propeller 19 rotates in one direction it draws air from outdoor through the matrix 2, when it rotates in the oposite direction it forces the exhaust air through the matrix to outdoor.

For instance, as shown in FIG. 1, fresh air is drawn by the propeller 19 from outdoor through screen 21, filter 17 into third chamber III, then through beds 2b, 2a, filter 16 into housing 18, then it is forced by propeller 19 through back draft damper 33 into fresh air duct 32.

When the rotation of the electric motor 20 is reversed by the controller 4, the exhaust air is drawn by the propeller 19 from duct 30 through damper 31 into housing 18, then it is forced through filter 16, beds 2a, 2b, filter 17, and screen 21 out of container 1 to outdoor.

Using a reversible axial air fan with the controller 4 reversing the rotation of the air fan in equal time intervals, the flow of the two air streams through the matrix container is periodic, countercurrent and balanced.

The variable timer controller 4 includes a variable timer, and a series of relays interconnected with the air fan 3, damper 35, water pump 41, heater 45, room thermostat and or humidistat (not shown in FIG. 1), and maintains the operation of the apparatus in four different modes required to maintain comfort in the building during the winter—heating season, summer—cooling season, and the rest of the year—ventilating season. The actual circuits of the controller 4 and the associated relays are not given in detail inasmuch as any number of different circuits can perform the same functions.

Since the apparatus is required to provide recovery of energy, dehumidification, cooling and ventilation functions, the controller 4 has the capability to control and maintain the operation of the apparatus in four operating modes including energy recovery, dehumidification, cooling and ventilation.

When operating in the energy recovery mode, either with the single bed or with the two bed matrix, the controller 4 maintains the damper 35 closed, the water pump 41 and heater 45 off, and the air fan 3 operating in a periodic reversing mode. The flow of the two air streams is periodic and countercurrent and substantially balanced. Transfer of heat and moisture is from the exhaust air into the matrix and then into the incoming outdoor fresh air as already described before.

When operating in a cooling mode, and with the two bed matrix, the controller 4 maintains the damper 35 closed, the water pump 41 on, and the operation of the air fan 3 in a reversing mode. The flow of the two air streams is periodic, countercurrent, and substantially balanced. The heat and mass transfer operations that are occurring in the matrix container are as follows:

During the sorption period:

The propeller 19 draws the warm and humid outdoor air from outdoor through opening 25, screen 21, filter 17, bed of adsorbent 2b, bed of heat absorbing material 2a, wet filter 16 into housing 18 and out via damper 33 into duct 32.

The warm humid outdoor air when passing through matrix is dehumidified by the active absorbent in bed 2b, the released sorption heat and the residual heat retained by the adsorbent from the preceded desorption period are conveyed by the heated dehumidified air into the bed of the heat absorbing material 2a which bed during the preceded desorption period was cooled by the exhausted air adiabatically cooled in wet filter 16. Simultaneously, as the heat absorbing material in bed 2a is being heated, the dehumidified outdoor air passing through bed 2a is being cooled. With respect to the perfectly countercurrent flow of the two air streams through the two beds 2b, 2a, the dehumidified outdoor air when passing through the bed of the heat absorbing material 2a is cooled down very close to the temperature of the previously adiabatically cooled exhaust air. Because of the large surface area and heat storage capacity of bed 2a, and because of the perfectly countercurrent flow of the two air streams and a relatively short operating cycle, sensible heat transfer effectiveness as high as 95% in bed 2a is economically feasible. Finally, when the dehumidified and cooled outdoor air is forced through the wet filter 16 it is washed and adiabatically cooled to a low temperature at which the fresh air is discharged from the container 1 into the fresh air duct 32.

When the controller 4 reverses the rotation of the electric motor 20 in the middle of the operating cycle, then during the desorption period:

The exhaust air is drawn by propeller 19 from the exhaust air duct 30 into housing 18, and then forced through the matrix container 1. When passing through the wet filter 16 the exhaust air is washed and adiabatically cooled. When passing through the bed 2a of the heat absorbing material, which bed was heated during the preceded sorption period, the exhaust air is heated up by absorbing heat released from the heat absorbing material while the heat absorbing material is being cooled. As the temperature of the exhausted air is increased, its relative humidity is reduced and its capacity to remove moisture from the adsorbent is increased. Because of the high thermal effectivness of the packed bed of the heat absorbing material 2a in retaining sorption heat, major portion of the adsorbed moisture can be removed from the adsorbent during the desorption period by the preheated exhaust air without using the heater 45. To remove the residual moisture from the adsorbent, shortly before the end of the desorption period the controller 4 automatically turns on the heater 45 which then rises the temperature of the preheated exhaust air and the temperature of the solids surrounding the heater 45 to complete the reactivation of the adsorbent in bed 2b. The exhaust air and the moisture during the desorption period are discharged out via opening 25 to outdoor.

With the two bed matrix the enthalpy of the incoming outdoor air can be reduced below the enthalpy of the exhaust air as required to provide cooling of the building. In this manner the apparatus supplies cool fresh air for cooling of the building and exhausts same volume of stale air out of the building.

When operating with the single bed matrix comprising a mixture of adsorbent and heat absorbing solids, controller 4 maintains the air fan 3 operating in a reversing mode, the damper 35 closed and the water pump 41 on.

During the sorption period, the outdoor warm and humid air when passing through the matrix is dehumidified and cooled by the matrix, which matrix was cooled in the preceded desorption period by the exhaust air adiabatically cooled in the wet filter 16. As the warm humid outdoor air is being cooled and dehumidified, the released sorption heat is being temporarily absorbed by the heat absorbing solids, the enthalpy of the incoming outdoor air is reduced close to the enthalpy of the exhaust air, and the temperature to the adiabatically cooled exhaust air. At these conditions the outdoor air after washing in wet filter 16 is discharged as clean fresh air out of the apparatus.

During the desorption period, the exhaust air when passing through the wet filter 16 is washed and adiabatically cooled, then when passing through the matrix cools the matrix while in turn it is being heated by the previously heated heat absorbing solids. As the exhaust air is heated its capacity to remove moisture from the adsorbent increases and consequently the moisture in the exhaust air rises while the moisture in the adsorbent drops. Because of the extremely large surface area of the matrix and because of the perfectly countercurrent flow of the two air streams, the moisture and temperature of the discharged exhaust air rise very close to the conditions of the incoming outdoor air. In this manner the apparatus with the single bed matrix produces clean and cooled fresh air for use in the building and exhausts same volume of stale air out of the building.

When operating in the dehumidifying mode, either with the single bed or with the two bed matrix, the controller 4 maintains the operation of the apparatus as described under the cooling mode with exception of the wet filter 16 which operates as a dry filter with the water pump 41 off.

When operating in the ventilating mode, either with the single bed or the two bed matrix the controller 4 maintains the damper 35 fully opened, the heater 45 off, and the operation of the air fan 3 and the wet filter 16 as follows:

(a) with the air fan continuously discharging exhaust air to outdoor the water pump 41 is off, (b) with the air fan continuously discharging the fresh air into duct 32 the water pump 41 may be either on or off, (c) with the air fan periodically and alternately discharging exhaust air to outdoor and fresh air into duct 32 the water pump 41 may be either on or off.

The effectiveness of the described dehumidifier-heat exchanger can be varied by varying the duration time of the two operating periods of the operating cycle by the variable timer controller 4 either manually or automatically.

In operations with low below freezing temperatures of the incoming outdoor air, to prevent build up of ice in the matrix, the duration time of the sorption period may be conveniently controlled by a temperature sensor controlling the temperature of the discharged exhaust air. Same results are achieved by increasing the duration time of the sorption period by the variable timer of the controller 4.

Since build up of ice is effectively prevented by controling the duration time of the sorption period, a defrost cycle and or a defrost heater is not needed, and the performance and the ventialtion capacity of the apparatus even under sever winter conditions remain unchanged.

Because the two air streams flow through the matrix countercurrently to each other, and because of the periodic flow reversals, cleaning of the matrix i.e. the packed bed solids and the filter media is less frequent than that with the direct type heat exchangers.

While the apparatus of the embodiment of FIG. 1 has been described with the matrix container 1 as being generally rectangular and vertical and with a reversible axial type air fan connected to the first chamber I, it is also feasible to make the container circular, either vertical or horizontal, and to replace the reversible axial air fan with two radial type air fans each provided by an overrunning clutch, with both air fans being driven by a reversible electric motor, and or to connect the reversible axial air fan or the two radial fans to the third chamber III of the container 1.

To provide higher static pressure it is feasible to replace the single reversible axial air fan with two axial fans operating simultaneously, or with two radial type air fans operating alternately. The two air fans may be interconnected with each other and then connected to the first chamber I, or to the third chamber III, or one air fan may be connected to the first chamber I, and the other to the third chamber III.

It should be also pointed out that to achieve a continuous flow of the two air streams one can conveniently operate, or connect two or more exchangers of the embodiment of FIG. 1 to a dedicated ducting of the fresh and exhaust air. In such situations it is also feasible to drive two or more axial or radial air fans by a single electric motor.

Though not shown in FIG. 1 it would be also feasible to install a heating and or cooling coil in first or in third chamber of the matrix container or in the dedicated ducting to heat or to cool the incoming outdoor air.

Figure 2:
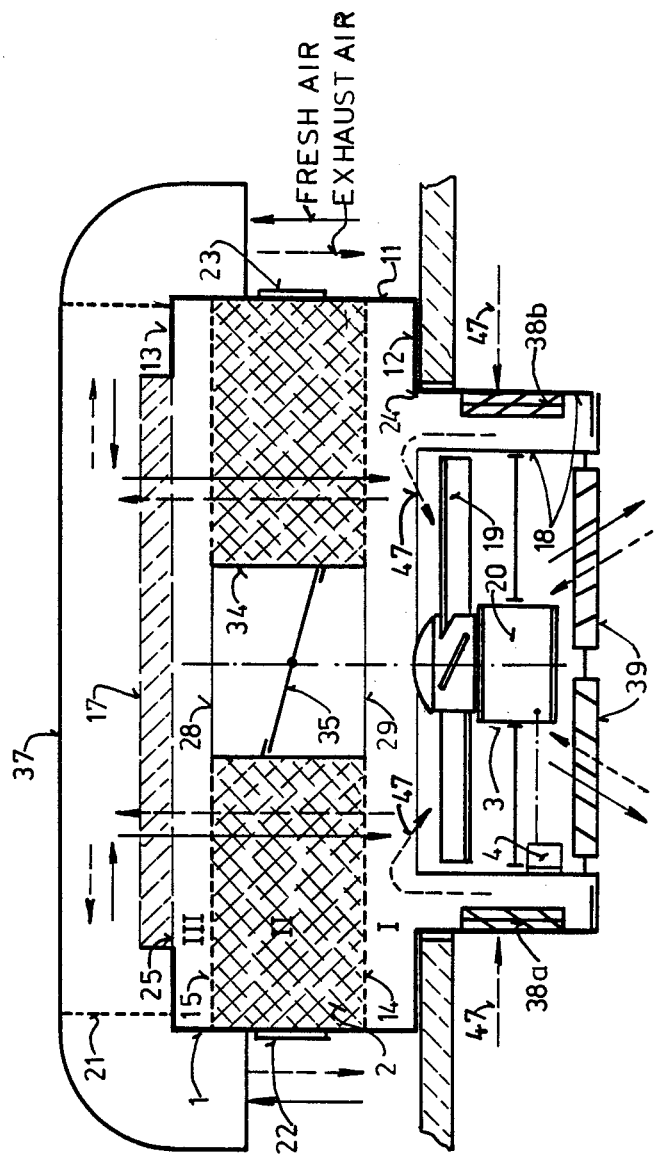
FIG. 2 is a schematic of another preferred embodyment of the apparatus of the present invention intended for use as a total energy recovery ventilator.

FIG. 2 shows another preferred embodiment of the apparatus of the present invention with a single bed matrix containing a mixture of granular solids of materials with heat and moisture sorption properties, with a circular container 1, provided with a vent cap 37, and with the air fan housing 18 in addition provided with dampers 38a, 38b, and directional louvers 39. The apparatus of FIG. 2 is intended for use as a roof or wall type energy recovery ventilator for (a) recovery and transfer of heat and moisture from the exhaust air (and air fan) to the incoming outdoor air during the winter-heating season, (b) rejection of heat and moisture from the incoming outdoor air during the summer-cooling season, and (c) ventilation of the building during good weather conditions-ventilating season. In addition, dampers 38a, 38b permit recirculation of the indoor air as indicated by arrows 47 during the winter-heating season. All other parts of the apparatus of FIG. 2 are same or similar as those described under the embodiment of FIG. 1.

Figure 3:
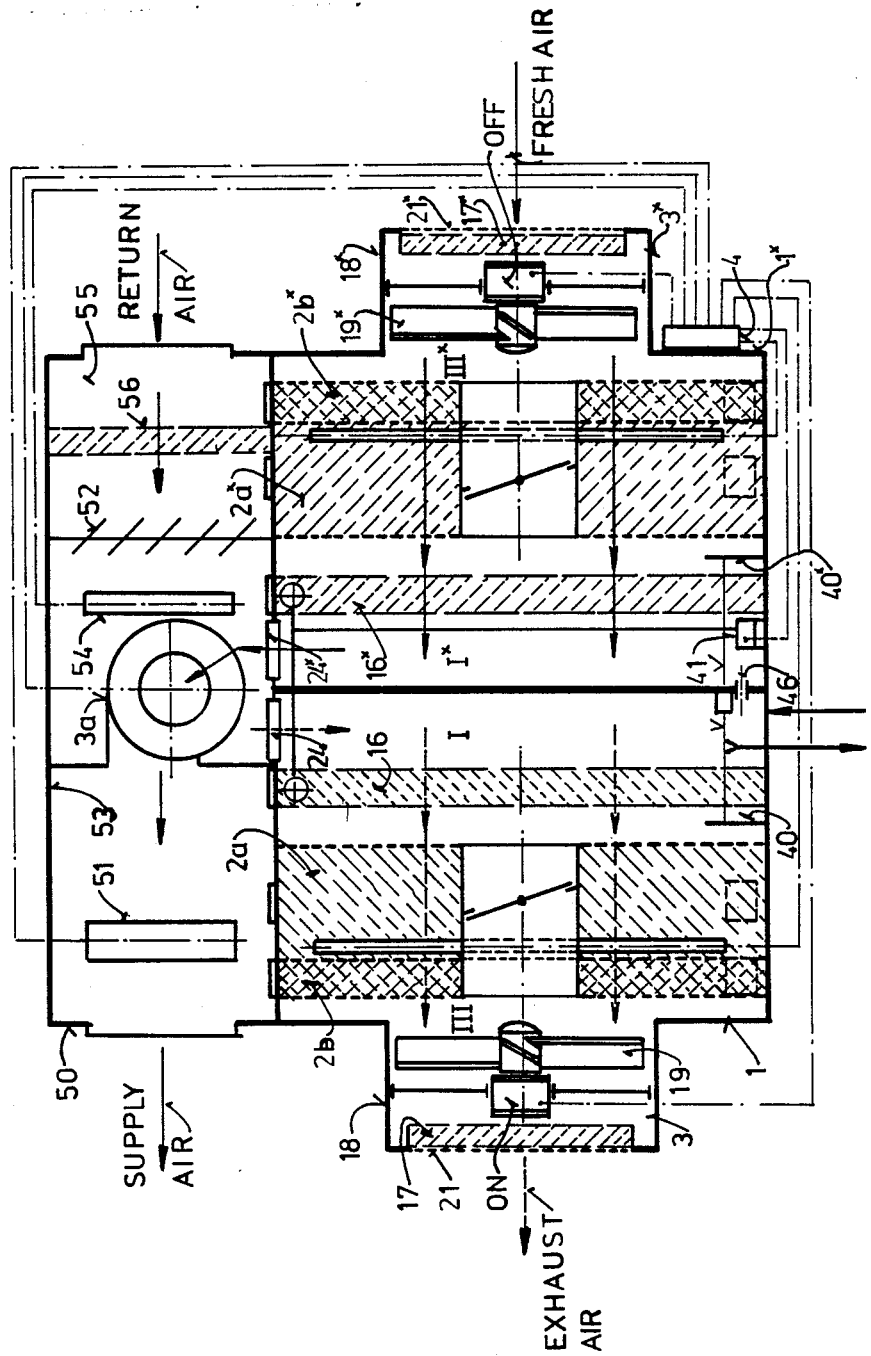
FIG. 3 is a schematic of another preferred embodyment of the apparatus of the present invention intended for use in air conditioning of buildings.

It is also feasible to connect two or more exchangers of the embodiment of FIG. 1 to a return-supply air ducting to provide simultaneously recirculation of the building's air, balanced ventilation of the building and heating and or cooling of the supply air as illustrated in FIG. 3.

FIG. 3 is a schematic of another preferred embodyment of this invention in which two exchangers 1, 1* of the embodiment of FIG. 1 are connected to housing 50. Housing 50 includes an air blower 3a, air filter 56, air damper 52 and a cooling coil 54 located in the return air chamber 55 of housing 50, and a heating coil 51 located in the supply air chamber 53 of housing 50.

Since the air blower 3a has to generate negative pressure in chamber 55 of housing 50 to draw the return air from the building, and since this negative pressure may be controlled by damper 52, it is feasible to use the air blower 3a to recirculate the return air through housing 50 and the building and also to draw the fresh outdoor air from outdoor through the exchangers 1, 1* during the periods when one of the air fans 3,3* is off.

FIG. 3 shows the exhaust air as being drawn by air fan 3 from chamber 55 of housing 50 via opening 24 into first chamber I of exchanger 1, then through wet filter 16, beds 2a, 2b into air fan 3 and then out via housing 18, filter 17 and screen 21 to outdoor, with the outdoor fresh air as being drawn by the air blower 3a via screen 21*, filter 17*, air fan housing 18* with air fan 3* being off into third chamber III*, then through beds 2b, 2a filter 16 into first chamber I* and via opening 24* into chamber 55 of housing 50, then into air blower 3a together with the return air and then discharged by blower 3a together with the return air into and through the supply air chamber 53. The heating and cooling coils 51, 54 are provided for heating and cooling of the supply air as desired to maintain comfort in the building.

To achieve balanced ventilation of the building, i.e. balanced flow of the two exhaust and fresh outdoor air through the exchangers 1, 1*, the total pressure drop across the exchangers during the two operating periods should be the same, i.e., the air fans 3, 3* when operating, have to generate a negative pressure in housings 18, 18* that is approximately equal to the sum of the overall pressure drop across the exchangers 1, 1* plus the negative pressure generated in chamber 55 of housing 50 by the air blower 3a, with the negative pressure in chamber 55 being approximately equal to the overall pressure drop across the exchangers 1, 1*. The alternate periodic operation of the air fans 3, 3*, and the continuous operation of the air blower 3a is maintained by the controller 4 which alternately switches on and off the two air fans 3, 3* in the middle of the operating cycle.

The two water containers 40, 40* are in communication with each other via pipe 46 to permit use of a single water pump 41 for both filters 16, 16*.

Obviously, air fans 3, 3* may also operate in a reversing mode, or may be replaced by two radial type air fans as described under embodiment of FIG. 1.

Since the apparatus of the present invention is simple, the cost of the matrix materials minimal, the life of the matrix substantially infinite, the heat and mass transfer surfaces are large, the heat and mass transfer effectiveness superior, and the modulation of the performance simple and reliable, the capital and operating costs of the invented dehumidifier-heat exchanger are expected to be substantially lower than that of the prior art.

The invented dehumidifier-heat exchanger can be applied to a number of different uses in various industrial processes or in heating, ventilation and cooling of industrial, commercial and residential buildings, houses and mobile homes.

SUMMARY OF DISCLOSURE

In summary of this disclosure, the present invention provides an improved periodic flow type dehumidifier-heat exchanger-ventilator for use in process-to-process, process-to-comfort, and comfort-to-comfort sensible heat, total energy, and or moisture transfer applications.

The apparatus operates at atmospheric pressures, with no leakage and with reduced flow resistances and increased effectiveness.

It uses simple stationary matrix in an inexpensive housing, conventional air fans and a variable timer controller for reliable operation. The apparatus avoids the expensive quick operating valving and ducting required by the prior art systems.

While the present invention has been described with reference to specific embodiments, and in specific applications to demonstrate the features and advantages of the invented apparatus, such specific embodiments are susceptible to modifications to fit other configurations or other conditions.

Accordingly, the forgoing description of the apparatus is not to be construed in a limiting sense.

What is claimed is:

1. An apparatus for ventilation, recovery of heat, dehumidification and cooling of gas operating with stationary matrix means in a short cycle comprising a sorption period and a desorption period and removing particulates and transferring moisture and or heat between two gas streams, said apparatus comprising:
   container means including at least one container for housing said matrix means, with each said container including front, rear and side walls and screen means, said screen means separating each said container into first, second and third consecutive chambers, said first and third chambers having at least one intake-exit opening for intake and exit of said two gas streams, said second chamber housing said matrix means and having flanged openings for replacement of said matrix means,
   matrix means including fine heat-absorbing solids, means retained by said screen means in each said container, said matrix means removing particulates, moisture, and or heat from one of said two gas streams during said sorption period of said operating cycle, and then releasing said particulates, moisture, and or heat into said other gas stream during said desorption period of said operating cycle,
   air fan means in communication with each said container and pumping said two gas streams alternately into, through and out of each said container and countercurrently to each other through said matrix means during said sorption and desorption periods of said operating cycle of each said container, and
   process control means including a variable timer and relays interconnected with said matrix means and air fan means, and maintaining said operating cycle of each said container and matrix means by regular periodic switching of said air fan means, and maintaining said operation of said apparatus in either of a heat recovery mode, a cooling mode, a dehumidifying mode, and or a ventilating mode, and permitting a continuous operation of said air fan means when operating in a continuous ventilating mode.

2. Apparatus of claim 1 with each said container including in addition a heating coil for heating of said one gas stream during said desorption period of said operating cycle during operation of said apparatus in said heat recovery mode.

3. Apparatus of claim 1 with each said container including in addition a cooling coil for cooling of said one gas stream during said sorption period of said operating cycle during operation of said apparatus in said dehumidifying mode and cooling mode.

4. Apparatus of claim 1 comprising in addition ducting means attached to and in communication with each said container and provided for connecting said apparatus to a dedicated ducting of said two gas streams, said ducting means including back draft dampers.

5. Apparatus of claim 4 including in addition a heating coil in said dedicated ducting for heating of one of said two gas streams.

6. Apparatus of claim 4 including in addition a cooling coil in said dedicated ducting for cooling of one of said two gas streams.

7. Apparatus of claim 1 comprising in addition housing means for recirculation of a gaseous stream, said housing means including an intake chamber and a discharge chamber, said intake chamber including blower means for recirculation, filter means for filtration and damper means for controlling the flow of said recirculated gaseous stream, and having intake-exit means for intake and exit of said two gas streams and said recirculated gaseous stream, said blower means being interconnected with and controlled by said process control means, said discharge chamber including an intake and an exit opening for said recirculated gaseous stream, with said first chamber of each said container being in communication with said intake chamber of said housing means through said intake-exit openings of said first chambers and said intake-exit means of said intake chamber of said housing means, with said air fan means drawing substantially continuously one of said two gas streams from said intake chamber of said housing means and alternately into, through and out of each said container, with said blower means drawing alternately said other gas stream into, through, and out of each said container and substantially continuously into said intake chamber of said housing means, then together with said recirculated gaseous stream through said housing means and out of said apparatus.

8. Apparatus of claim 7 with said air fan means in addition simultaneously forcing said other gas stream alternately into, through and out of said each container and substantially continuously into said intake chamber of said housing means.

9. Apparatus of claim 7 comprising in addition a cooling coil installed in said housing means, said cooling coil provided for cooling of said recirculated gaseous stream.

10. Apparatus of claim 7 comprising in addition a heating coil installed in said housing means, said heating coil provided for heating of said recirculated gaseous stream.

11. Apparatus of claim 10 comprising in addition a cooling coil installed in said housing means, said cooling coil provided for cooling of said recirculated gaseous stream.

12. Apparatus of claim 1 with said air fan means including a reversible axial type air fan.

13. Apparatus of claim 1 with said air fan means including two axial or radial type air fans for each said container.

14. Apparatus of claim 1 with said air fan means including a single reversible electric motor operating two radial type air fans each provided with an overrunning clutch.

15. Apparatus of claim 1 with said air fan means including a single reversible electric motor driving two axial type air fans for said each two containers.

16. Apparatus of claim 1 with said air fan means including two electric motors each driving two air fans, ducting means interconnecting said air fans and said each two containers.

17. Apparatus of claim 1 with said matrix means including at least one porous bed of fine solids means materials having moisture and heat sorption properties.

18. Apparatus of claim 17 including in addition wet filter-humidifier means for washing and adiabatically cooling said two gas streams.

19. Apparatus of claim 1 with said matrix means including at least two porous beds of fine solids means separated from each other by said screen means, said beds having distinguished moisture and heat sorption properties.

20. Apparatus of claim 19 with said matrix means in addition including a heater for heating of a portion of said one bed of fine solids means and one of said two gas streams during at least a part of said desorption period of said operating cycle.

21. Apparatus of claim 20 including in addition wet filter-humidifier means for washing and adiabatically cooling said two gas streams.

22. Apparatus of claims 17, 19 and 18 with said matrix means in addition including a heater for heating of one of said two gas streams during at least a part of said desorption period of said operation cycle.

23. Apparatus of claim 1 with each said container in addition having said first and third chambers in communication with each other via bypass duct means including damper means for controlling the flow of said two gas streams through said bypass duct means.

24. Apparatus of claim 1 including in addition wet filter humidifier means for washing and adiabatically cooling said two gas streams.

* * * * *